UNITED STATES PATENT OFFICE.

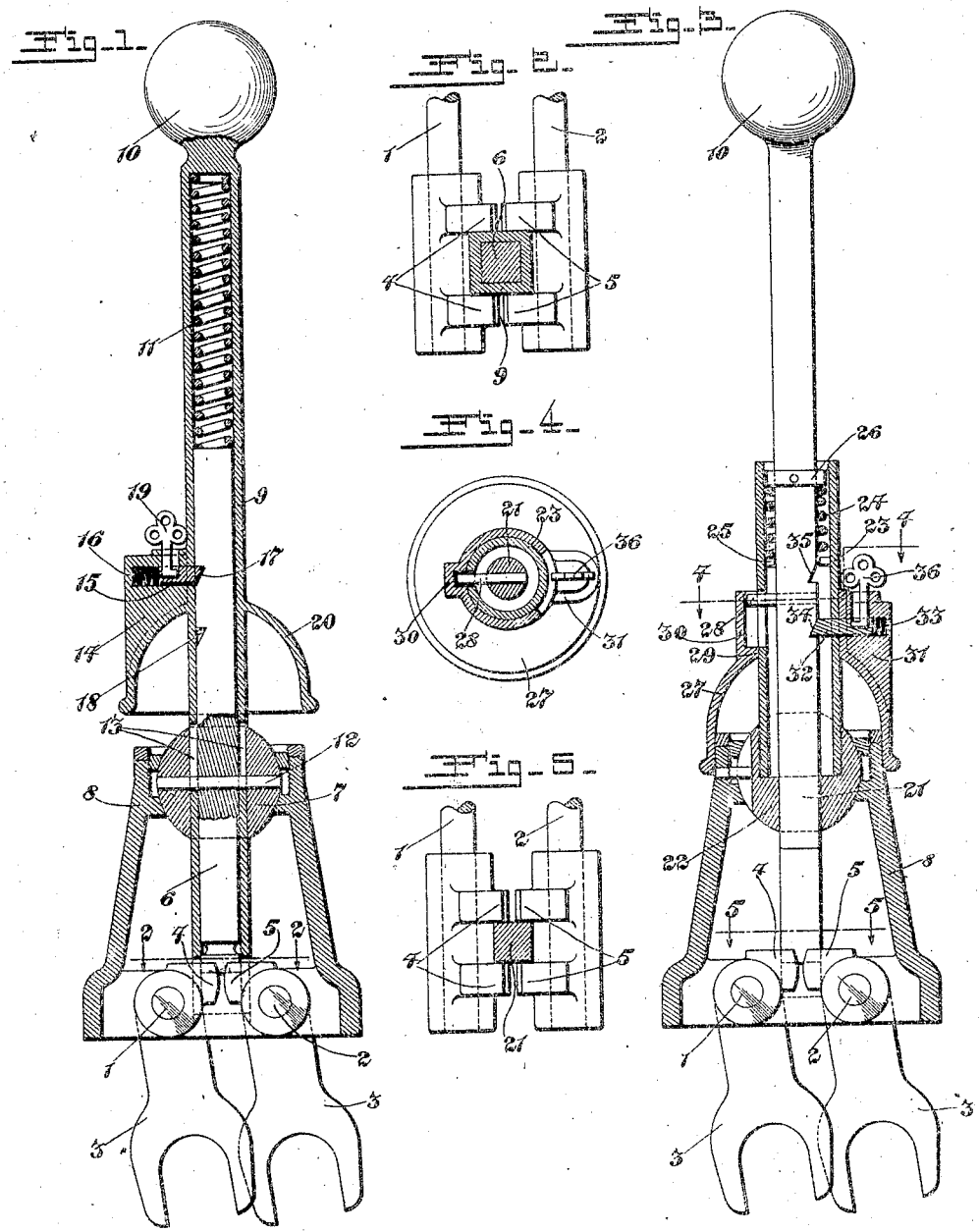

EMIL V. NOSER, OF ST. LOUIS, MISSOURI.

LOCK FOR SHIFT-LEVERS OF AUTOMOBILES.

1,313,412.   Specification of Letters Patent.   Patented Aug. 19, 1919.

Application filed February 14, 1919.   Serial No. 277,051.

*To all whom it may concern:*

Be it known that I, EMIL V. NOSER, a citizen of the United States, residing at the city of St. Louis and State of Missouri, have invented a new and useful Lock for Shift-Levers of Automobiles, of which the following is a specification.

This invention relates to locks for shift levers of automobiles.

An object of the invention is to provide an improved construction and arrangement by which the shift lever of an automobile may be locked in order to prevent manipulation thereof.

In the drawings, Figure 1 is a sectional view illustrating a preferred embodiment of the invention.

Fig. 2 is a cross sectional view on the line 2—2 of Fig. 1.

Fig. 3 is a sectional view illustrating another form of the invention.

Fig. 4 is a sectional view on the line 4—4 of Fig. 3.

Fig. 5 is a sectional view on the line 5—5 of Fig. 3.

As shown there are two axially movable shafts, of which the shaft 1 is shiftable axially in one direction and the shaft 2 is shiftable axially in the other direction.

These shafts are connected with a control mechanism which is not shown, by means of arms 3. The shaft 1 supports two arms 4 and the shaft 2 supports two arms 5 which are similar to the arms 4. The arms 4 and 5 are rigid on the shafts 1 and 2 respectively and extend toward each other, so that when the two shafts are in idle or neutral positions the arms 4 are in alinement with the arms 5 respectively, as shown in Fig. 2. The shift lever is employed whereby either of the shafts 1 and 2 may be shifted axially.

My invention comprises a construction and arrangement whereby the shift lever may be locked in position between the pairs of arms 4 and 5 and held from movement in either direction, thus locking the shift lever in an inoperative position.

In the embodiment shown in Fig. 1 the shift lever comprises a rod 6 extending through and having rigid connection with a ball pivot 7 mounted in a support 8 for turning movement in any direction; and a tubular member 9 inclosing the rod 6, extending through the ball 7, having a handle 10 on its upper end, and being arranged for axial movement. In operative position the member 9 is supported in its uppermost adjustment by a spring 11 inclosed therein and having its lower end bearing upon the upper end of the rod 6. The member 9 is prevented from turning on the rod 6 by a pin 12 in the ball 7 passing through slots 13 in the member 9 and through the rod 6.

The lower end of the rod 6 is between the arms 4 and 5 and is capable of movement laterally to engage only the arms 4, or only the arms 5 as desired. Thus when it is desired to shift the shaft 1 the shift lever is oscillated first to position in which the lower end of the rod 6 is out of engagement with the arms 5, after which the shift lever may be moved in another direction to shift the shaft 1 axially; and on the other hand, when it is desired to shift the shaft 2 the shift lever is oscillated first to position in which the lower end of the rod 6 is free from the arms 4, after which the shift lever may be operated to shift the shaft 2 without interference by the arms 4.

In normal position the lower end of the tubular member 9 is above the arms 4 and 5, thus permitting the shift lever to be operated as described. When it is desired to lock the shift lever in inoperative or neutral position, the shafts 1 and 2 are adjusted in the positions shown in Fig. 2, after which the member 9 is forced downwardly in opposition to the spring 11 to a position in which the lower end of said member 9 is placed between the arms 4 and 5 and a sufficient distance below the upper edges of the sleeves with which said arms are connected to prevent lateral movement of the shift lever. The lower or locking position of the member 9 is indicated by dotted lines in Fig. 1. When so positioned it is impossible to oscillate or to move the shift lever laterally out of engagement either with the arms 4, or out of engagement with the arms 5. Consequently, the shift lever being in engagement with both pairs of the arms 4 and 5, it is impossible to shift either of the shafts 1 or 2 because, as stated, they are capable of axial movement in opposite directions only.

The member 9 may be locked in locking position described by any appropriate locking mechanism provided for that purpose. For instance, as shown, a lock case 14 is secured to the member 9 and supports a lock bolt 15 pressed inwardly by a spring 16. In the upper adjustment or position of the member 9 the lock bolt engages in a recess 17 in the rod 6; and in the lower or locking position of the member 9 the lock bolt engages in a recess 18 in said rod 6. Thus the member 9 is locked in either adjustment in which it may be placed. The lock bolt 15 may be released by a key 19.

The lock illustrated is merely conventional and I do not intend to restrict myself to the use of any specific type of lock.

In its lower or locked position a cover 20 contacts with the support 8 and thus prevents access to any of the parts coöperating with the pivot 7 supporting the shift lever.

In the form of the invention shown in Fig. 3 an axially movable rod 21 is employed. The rod 21 extends through the ball pivot 22 and through a sleeve 23 bearing upon the upper side of the ball. The rod 21 is supported in its upper adjustment by a spring 24 having its lower end supported by a flange 25 within the sleeve 23, and its upper end bearing against a collar 26 on the rod 21. In the upper position of the rod 21 the lower end thereof is capable of movement laterally into engagement either with the arms 4 or the arms 5; and in its lower position the lower end of the rod 21 is between the sleeves supporting the arms 4 and 5 and is incapable of lateral movement. The lower position of the rod is indicated by dotted lines in Fig. 3.

A cover 27, similar to the cover 20 previously described, protects the support and pivot for the shift lever. In the lower or depressed position of the shift lever the cover 27 is held positively from displacement by a projection 28 on the rod 21 engaging the shoulder 29 on the cover. The projection 28 operates within a guide 30 and thereby the rod 21 is held from turning.

The rod 21 may be locked in its lower adjustment described by any appropriate locking mechanism provided for that purpose. For instance, as shown, a lock case 31 is in connection with the cover 27 and supports a lock bolt 32 pressed inwardly by a spring 33. In the upper adjustment of the rod 21 the lock bolt engages in a recess 34 in the rod 21; and in the lower position of the rod 21 the lock bolt engages in a recess 35 in said rod. Thus the rod is locked in either adjustment in which it may be placed, but in the form shown the rod may be forced downwardly to its lower position without the use of a key to retract the lock bolt. The lock bolt may be released from the recess 35 by a key 36 to permit the spring 24 to raise the rod to operative position.

The invention may be varied in other respects without departure from the principle thereof. I do not restrict myself to unessential features or limitations, but what I claim and desire to secure by Letters Patent, is:—

1. In a device of the character described, the combination with shiftable elements, and an axially and laterally movable lever which is movable laterally into engagement with said elements respectively for shifting any one of said elements and which is movable axially into engagement with two of said elements, whereby movement of said lever to shift one of said elements is prevented by the engagement of said lever with the other element.

2. In a device of the character described, the combination with a pair of shifting shafts movable axially in opposite directions, projections on said shafts, and an axially and laterally movable shift lever supported in position to be moved laterally into engagement with the projections on either of said shafts as desired, and out of engagement with the projections on the other shaft as required to enable said lever to move either of said shafts axially in the direction in which the same may be moved, said lever being movable axially to position to engage the projections on both of said shafts simultaneously, and thereby prevent movement of said lever to shift either one of said shafts.

3. In a device of the character described, the combination with a pair of shifting shafts movable axially in opposite directions, projections on said shafts, and an axially and laterally movable shift lever supported in position to be moved laterally into engagement with the projections on either of said shafts as desired, and out of engagement with the projections on the other shaft as required to enable said lever to move either of said shafts axially in the direction in which the same may be moved, said lever being movable axially to position to engage the projections on both of said shafts simultaneously, and thereby prevent movement of said lever to shift either one of said shafts, and means for locking said lever in the axial position which it occupies when said lever is in engagement with the projections on both of said shafts.

4. In a device of the character described, the combination with a pair of shifting shafts movable axially in opposite directions, projections on said shafts, an axially and laterally movable shift lever supported in position to be moved laterally into engagement with the projections on either of said shafts as desired, and out of engagement with the projections on the other shaft as required to enable said lever to move either of said shafts axially in the direction in which the same may be moved, said lever being movable axially to position to engage the projections on both of said shafts simultaneously, and thereby prevent movement of said lever to shift either one of said shafts, means for locking said lever in the axial position which it occupies when said lever is in engagement with the projections on both of said shafts, and a device for moving said lever axially to position in which said lever may be moved laterally into engagement with the projections on either one of said shafts as desired.

5. In a device of the character described, a pair of shafts shiftable axially in opposite directions, a pivoted support, a rod carried by said support for shifting said shafts axially in opposite directions, a member in connection with said rod for moving said rod, said member being movable to position to prevent movement of said rod, and means for locking said member in said position.

6. In a device of the character described, a pair of shafts shiftable axially in opposite directions, a pivoted support, a rod carried by said support for shifting said shafts axially in opposite directions, a member in connection with said rod for moving said rod, said member being movable to position to prevent movement of said rod, a device carried by said member for locking said member in said position, means for unlocking said member, and a device for moving said member to its initial position.

7. In a device of the character described, a pair of shafts shiftable axially in opposite directions, a pivoted support, a rod carried by said support for shifting said shafts axially in opposite directions, a member in connection with said rod for moving said rod, said member being movable to position to prevent movement of said member, means for locking said member in said position, means for unlocking said member, and means for moving said member to position to permit movement of said rod when said member is unlocked.

8. A device of the character described, comprising a pair of shafts shiftable axially in opposite directions, a pivoted support, a lever supported by said pivoted support and being movable axially to different positions in one of which it is operable to shift either one of said shafts axially and in the other of which it is inoperative to move either of said shafts, a spring supporting said lever in operative position and arranged to yield to permit movement of said lever to inoperative position, and a lock for locking said lever in its different positions.

9. A device of the character described, comprising an axially shiftable shaft, an axially movable lever member for shifting said shaft axially, a support, a pivoted element mounted in the support for supporting the lever member, and a cover in connection with the lever member movable thereby to cover the pivoted element to prevent access thereto when the lever member is in one position.

10. A device of the character described, comprising an axially movable lever member, a support, a pivoted element mounted in the support for supporting the lever member, a cover in connection with the lever member movable thereby to cover the pivoted element to prevent access thereto when the lever member is in one position, and a lock inclosed by the cover for locking the lever member in different adjustments.

EMIL V. NOSER.